Aug. 11, 1959

W. S. KLECZEK 2,899,168

PRESSURE REGULATOR

Filed Dec. 3, 1954

INVENTOR.
Walter S. Kleczek
BY
W. E. Thibodeau + A. W. Dew
ATTORNEYS

United States Patent Office 2,899,168
Patented Aug. 11, 1959

2,899,168

PRESSURE REGULATOR

Walter S. Kleczek, Schenectady, N.Y., assignor to the United States of America as represented by the Secretary of the Army Application December 3, 1954, Serial No. 473,060

1 Claim. (Cl. 251—62)

The invention described herein may be manufactured and used by or for the Government for governmental purposes without the payment of any royalty thereon.

This invention relates to a high-pressure quick-operating pneumatic pressure regulator.

Known available pressure regulators which have been tested for use in certain types of rocket missiles have not been capable of delivering and maintaining a constant high pressure head at the point of use under very rapid changes of flow rate.

An object of the invention is to provide a pressure regulator which is insensitive to inlet pressure and which is capable of delivering a closely regulated pressure of the order of 30 p.s.i. while the inlet pressure varies from over 2000 p.s.i. to 100 p.s.i. Another object of the invention is to provide a pressure regulator which will respond rapidly to maintain the discharge pressure within allowable limits under very rapid changes of flow rate and large variations in upstream pressure.

A further object of the invention is to provide a pressure regulator wherein the controlling pressure is taken from the point in a pressurized system where the pressure is to be regulated, eliminating all effects of intermediate line drops between the regulator valve and the point at which the pressure is to be controlled.

Figure 1:
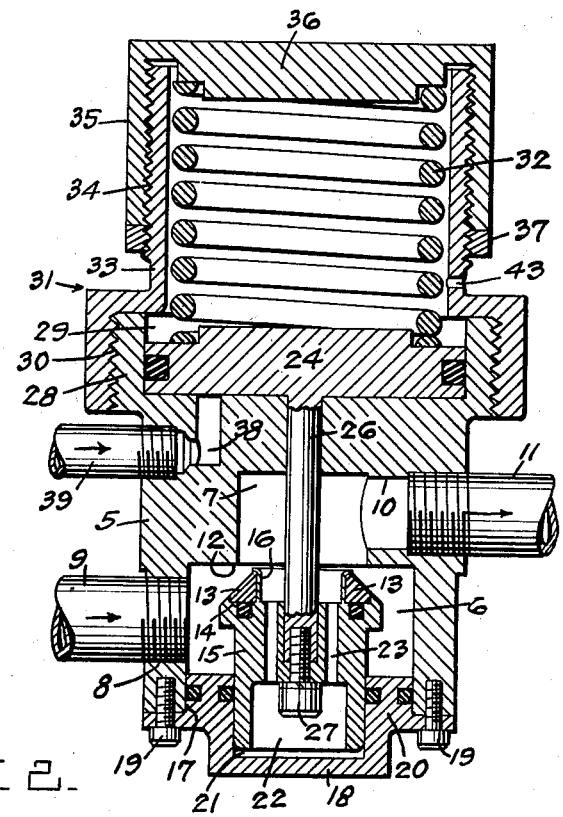
Figure 2:
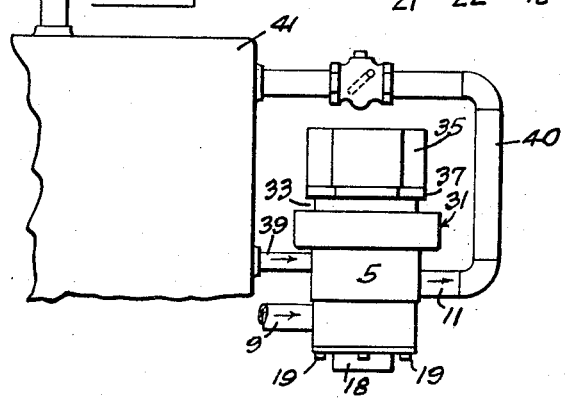

Other objects and advantages will be apparent from the following detailed description and the accompanying drawings, in which:

Figure 1 is a longitudinal sectional view through a preferred form of the invention, and Figure 2 is a diagrammatic view showing a valve constructed according to the present invention connected in a pressurized system.

Referring now to the drawings, 5 indicates a valve body or housing having an upstream chamber 6 and a downstream chamber 7. The upstream chamber 6 has a port 8 into which an inlet pressure connection 9 is secured and the downstream chamber 7 has a port 10 into which an outlet connection 11 is secured. The downstream chamber 7 is of lesser diameter than the upstream chamber 6 and is in communication therewith forming a shoulder 12 at their junction to serve as a valve seat for the bevelled face of a valve washer 13. The washer 13 is seated in a recess 14 in a valve plunger 15 and retained therein by the out-turned end of a diametrically reduced extension 16 of the plunger.

The upstream chamber 6 has its outer end 17 sealed by a cap 18 secured to the valve body 5 by screws 19. Formed with the cap and extending into the upstream chamber 6 is a thickened portion 20 which is axially bored at 21 to slidably receive and axially guide the valve plunger 15. That end of the plunger 15 in the axial bore 21 of the cap is bored as at 22 and the plunger is further provided with a group of smaller bores 23 extending therethrough to equalize pressure on both ends thereof to effect rapid response to a coaxial control piston 24. The control piston is provided with an axially disposed connecting rod 26 which extends axially into the plunger 15 and is secured therein for movement with the control piston by a screw 27.

That end of the valve body 5 remote from the upstream chamber 6 is diametrically enlarged at 28 and axially bored to form a control pressure chamber 29 in which the control piston 24 reciprocates. Secured to the end 28 of the valve body 5 by any suitable means, such as screw threads 30, is a spring housing 31 containing a coil spring 32. The spring housing is reduced diametrically at 33 to form a guide barrel for the coil spring, and is externally screw threaded at 34 for engagement with an internally screw threaded cap 35. The closed end 36 of the cap 35 bears on the outer end of the coil spring 32 to bias the control piston 24 toward the inner end of the control pressure chamber and the valve plunger washer 13 away from its seat on the shoulder 12. A locknut 37 screw threaded onto the reduced part of the spring housing secures the cap 35 in any selected position. A pressure control inlet port 38 and a short pressure control connection 39 admit controlling pressure to the side of control piston 24 opposite the spring to effect movement of the control piston against the bias of coil spring and thereby maintain the pressure at the point of regulation or utilization within a predetermined small reduced pressure range.

Figure 2 illustrates a pressurized system illustrating the use of the invention. High pressure from a source (not shown) enters the valve body 5 through the connection 9 and passes out through the connection 11 to a pressure line 40 and thence to a storage tank 41. The tank pressure is introduced below piston 24 by the short connection 39 and to the point of use by the line 42.

The operation of the invention is as follows:

With no pressure applied to the system the spring 32 forces the control piston 24 to the maximum inward position, holding the valve plunger 15 and its washer away from the shoulder 12 and providing a path for high-pressure fluid to flow from the upstream port 8 to the downstream port 10. The cap 35 is adjusted longitudinally to place a desired tension on the spring depending on the desired pressure at the point of utilization. When pressure in the tank 41 comes up to the desired value as set by adjustment of cap 35, it flows through the short pressure connection 39 and port 38 to the inner side of the control piston chamber 29 and forces the control piston 24 outwardly against the bias of the spring 32. The piston 24 draws the valve plunger 15 with its washer 13 toward the shoulder 12 to reduce the flow of fluid to the tank until the set pressure is attained therein. When flow of fluid is started from the pressurized tank 41 by way of the line 42 pressure in the tank and in the control pressure chamber 29 will immediately fall allowing the spring to force the piston 24 and valve plunger inwardly again to maintain the desired pressure in the tank 41.

Due to the passageways 23 placing the low-pressure chamber 7 in communication with the bore 21 below the piston 15, the latter is balanced and is under control only of the differential forces of spring 32 and control pressure below piston 24. An opening 43 in the spring chamber prevents pressure build up therein.

I have thus provided a quick operating valve assembly in which the inlet or outlet pressure effects are balanced out, resulting in a tank pressure that is constant within a very small range regardless of supply pressure, and is of great utility in the precise control of self-propelled missiles. The regulator forming the subject of this application has successfully delivered 30 p.s.i.±1 p.s.i. while inlet pressures varied between 2200 and 100 p.s.i., gage. At zero flow the lock-up pressure in the model shown, was 38 p.s.i.

While I have disclosed a form of the invention presently preferred by me, various changes and modifications will occur to those skilled in the art after a study of the present disclosure. Hence the disclosure is to be taken in an illustrative rather than a limiting sense; and it is my desire and intention to reserve all modifications falling within the scope of the subjoined claim.

Having now fully disclosed the invention, what I claim and desire to secure by Letters Patent is:

In a high pressure quick operating valve; a cylindrical body having an enlarged head at one end, said body having in the end with the enlarged head an axial first bore defining a first chamber, said first chamber having a port connecting with the peripheral surface of said body, said body having in the other end an axial second bore defining a second chamber, an outlet connection in said second chamber, said second bore being counter bored to form a third chamber, an inlet connection in said third chamber, said bore and counter bore forming at their junction a valve seat shoulder, said body having a partition between said first and second chambers and having a central bore therethrough; a detachable cap fastened in a fluid tight connection to the counterbored end of said body, said cap extending into said counterbore and having an axial bore therein of the same diameter as the second bore of said body; a cylindrical plunger having a base end of substantially the same diameter as the bore in said cap and adapted to slide axially therein, and having a head end of larger diameter than said base end, said head end having a beveled peripheral edge and an annular recess, said base end and said head end both having a bore, a partition provided therebetween, said partition having a central bore therethrough terminating in a counterbore at the head end, said partition being provided with a plurality of radially spaced longitudinal passageways through said partition; a beveled annular washer seated in said recess in the head end of said plunger; a control piston and rod integral therewith, said rod being adapted to slide in the bore of the body partition and received in said counter bore of said plunger, said piston being adapted to slide in said first chamber of said body; a fastening means in said central bore of said plunger securing said piston rod to said plunger; a detachable cylindrical spring housing fastened to the enlarged head of said body, said housing having a vent communicating with the atmosphere; a detachable spring stop threaded to said spring housing; a coil spring in said spring housing biased between said piston and spring stop and tending to force said plunger from said valve seat shoulder.

References Cited in the file of this patent

UNITED STATES PATENTS

| | | |
|---|---|---|
| 545,083 | Locke | Aug. 27, 1895 |
| 746,755 | Spencer | Dec. 15, 1903 |
| 1,294,151 | Page | Feb. 1, 1919 |
| 1,525,426 | Mueller | Feb. 3, 1925 |
| 1,917,698 | Carson | July 11, 1933 |
| 2,273,535 | Peo | Feb. 17, 1942 |
| 2,556,623 | Lipkau | June 12, 1951 |
| 2,783,020 | Kleczek | Feb. 26, 1957 |